United States Patent
Christen et al.

(10) Patent No.: US 8,585,093 B2
(45) Date of Patent: Nov. 19, 2013

(54) METHOD OF PRODUCING A BOOKLET, DATA PAGE PRODUCED BY THIS METHOD AND BOOKLET PRODUCED BY THE METHOD

(75) Inventors: Paul Christen, Aarau (CH); Stefan Egli, Basel (CH); Christof Stutz, Thalwil (CH); Oliver Fankhauser, Brittnau (CH); Stephan Hofstetter, Niedererlinsbach (CH)

(73) Assignee: Trüb AG, Aarau (CH)

( * ) Notice: Subject to any disclaimer, the term of this patent is extended or adjusted under 35 U.S.C. 154(b) by 0 days.

(21) Appl. No.: 13/597,326

(22) Filed: Aug. 29, 2012

(65) Prior Publication Data

US 2012/0319394 A1  Dec. 20, 2012

Related U.S. Application Data

(63) Continuation of application No. 11/883,315, filed on Jun. 2, 2008, now Pat. No. 8,336,915.

(51) Int. Cl.
  *B42D 15/00* (2006.01)
  *B42D 1/00* (2006.01)
  *G09C 3/00* (2006.01)

(52) U.S. Cl.
  USPC ............... 283/63.1; 283/75; 283/77; 283/74; 281/27

(58) Field of Classification Search
  USPC .................. 283/74–75, 77, 63.1; 281/27
  See application file for complete search history.

(56) References Cited

U.S. PATENT DOCUMENTS

| | | | |
|---|---|---|---|
| 596,607 A | 1/1898 | Muhlhauser | |
| 5,566,979 A | 10/1996 | Ong | |
| 5,590,912 A | 1/1997 | Stevens | |
| 5,897,144 A | 4/1999 | Uno | |
| 6,135,503 A | 10/2000 | Lob et al. | |
| 7,040,981 B2 | 5/2006 | Iliescu et al. | |
| 7,758,079 B2 * | 7/2010 | Beyer-Meklenburg et al. | 283/75 |
| 7,762,590 B2 | 7/2010 | Staub et al. | |
| 7,832,771 B2 | 11/2010 | Hoeppner et al. | |
| 2007/0182154 A1 | 8/2007 | Hoeppner et al. | |

FOREIGN PATENT DOCUMENTS

WO  WO2006053738  *  5/2006

* cited by examiner

*Primary Examiner* — Kyle Grabowski
(74) *Attorney, Agent, or Firm* — The Webb Law Firm

(57) ABSTRACT

The booklet comprises a number of sheets between a cover, and each sheet has a front side and a rear side. At least one data page is provided that is joined to the cover in a fixed manner. The data page comprises a flexible layer and this flexible layer projects with an area out of a data carrier. On this area, the data page is joined to the cover and to the remaining sheets. The flexible layer is flatly joined to at least one other layer, for example, by welding or bonding and is thus inseparably bound without a mechanical joining part.

20 Claims, 3 Drawing Sheets

METHOD OF PRODUCING A BOOKLET, DATA PAGE PRODUCED BY THIS METHOD AND BOOKLET PRODUCED BY THE METHOD

CROSS REFERENCE TO RELATED APPLICATIONS

This application is a continuation application of U.S. patent application Ser. No. 11/883,315, filed Jun. 2, 2008, which is herein incorporated by reference in its entirety.

BACKGROUND OF THE INVENTION

1. Field of the Invention

The invention relates to a method of producing a booklet, in particular identity papers. The invention additionally relates to a data page, manufactured according to this method and a booklet manufactured according to this method.

2. Description of Related Art

Identity papers and, in particular, passports contain personal data which should be integrated as securely as possible into the booklet or passport. In order to increase the security, it is known to introduce data pages as data carriers into passports. As a result, security against manipulations can also be increased substantially. These data pages contain at least one personalization page and can be made of comparatively rigid plastic, for example polycarbonate. If such rigid data pages are bound in, for example sewn in, then under certain circumstances the passport or the booklet can no longer be closed completely. In addition, given frequent use and, in particular, frequent bending of the booklet, fractures can arise in the plastic of the data page.

In the prior art, a plurality of solutions have already been presented as to how data pages which are intrinsically difficult to bend could be bound into the booklet.

For example, EP 1 008 459 A discloses a method of producing a booklet which has a plurality of paper sheets and a cover and a plate as data carrier. In order to bind the plate in, a band is provided, which is connected mechanically to the plate. In order to connect the band to the plate, a plastic strip is provided which has studs which engage in corresponding apertures in the band and therefore connect the band mechanically to the strip. In addition, the strip is adhesively bonded or welded to the band. Connecting the band to the plate is comparatively complicated, and the strip needed for the connection represents an additional part, which has to be produced and mounted and increases the thickness of the data page.

WO 98/19870 discloses a passport having a data page made of thermoplastic material, which has an opaque core layer (inlet layer) and a flexible thermoplastic layer. The flexible thermoplastic layer is sewn directly into the book. Here, too, there is the problem of the brittleness of the thermoplastic material.

SUMMARY OF THE INVENTION

The invention is based on the object of providing a method of the type cited which avoids the aforementioned difficulties. The method is to permit the production of a booklet in which the data carrier is bound in more simply and nevertheless securely.

In the method according to the invention, a flexible layer is connected directly to the data carrier, the flexible layer having further connecting means which connect the said layer substantially non-detachably to the data carrier. The apertures are formed in particular by mesh openings of a textile. In particular during lamination, material of the data carrier penetrates into the apertures or mesh openings. An additional part for a mechanical connection is not required in this method. The region of the flexible layer projecting out of the data carrier is, for example, sewn in directly.

The flexible layer according the invention is a textile, for example a woven fabric or a thin sheet that is flexible and provided with apertures. According to a development of the invention, it forms a central layer between two outer layers, which contain the data provided for personalization. This results in a particularly durable connection. According to a development of the invention, the data carrier forms an inner layer or an inner region between two flexible layers. These two layers are produced in particular from a woven fabric or a textile.

According to a development of the invention, the flexible layer is bound in by lamination. As a result, a particularly intimate and substantially non-detachable connection between the flexible layer and the data carrier can be achieved. This results in particularly high security against forgery and manipulation. This is the case even when the flexible layer is bound into the data carrier only in some regions. Here, too, the flexible layer can be on the inside or outside.

According to a development of the invention, the flexible layer has mesh openings or other apertures or cutouts. The two outer layers are connected to each other through these apertures, in particular laminated, adhesively bonded or welded to each other. The security against manipulation can therefore be increased still further.

According to a development of the invention, the flexible layer extends over the entire region of the data carrier. The flexible layer preferably has the mesh openings or apertures in the entire region of the data carrier, through which the laminated layers are connected to each other, for example laminated, welded or adhesively bonded.

According to a development of the invention, the laminated layers of the data carrier are produced from polycarbonate. By using this material, for example, a very permanent and substantially non-detachable connection through a fabric can be produced by means of lamination, adhesive bonding or welding. In this case, too, the data carrier can be an inner layer which is bound into flexible layers.

According to a development of the invention, the flexible layer, in particular in the protruding region, is provided with security features, in particular with embossing, printing, pigmentations or threads woven in. The security against manipulation is increased still further as a result. This means that it is virtually impossible to replace the data carrier by another without being noticed, in that the connection to the flexible material is detached. The threads woven in or bound in can also be loose. As a result, it is virtually impossible to replace the data carrier or the data page without being noticed.

According to a development of the invention, the flexible layer is a folded sheet, which is connected to the booklet at a fold, for example sewn in. The protruding flexible region can in this case be comparatively narrow and, for example, can have a size of a few millimetres, for example 2-3 mm. The data carrier is laid in between the two parts of the sheet and firmly connected to these parts. The connection can be made by lamination. The data carrier can be a thin sheet or an injection-moulded part and can contain an electronic component, in particular a chip. Likewise, an antenna, which permits the non-contact transmission of data, can be arranged between the parts of the sheet.

The invention additionally relates to a data page and a booklet and, in particular, a passport which contains such a, data page and is produced by this method.

An exemplary embodiment of the invention will be explained in more detail below using the drawing, in which:

DETAILED DESCRIPTION OF THE PREFERRED EMBODIMENTS

Figure 7:
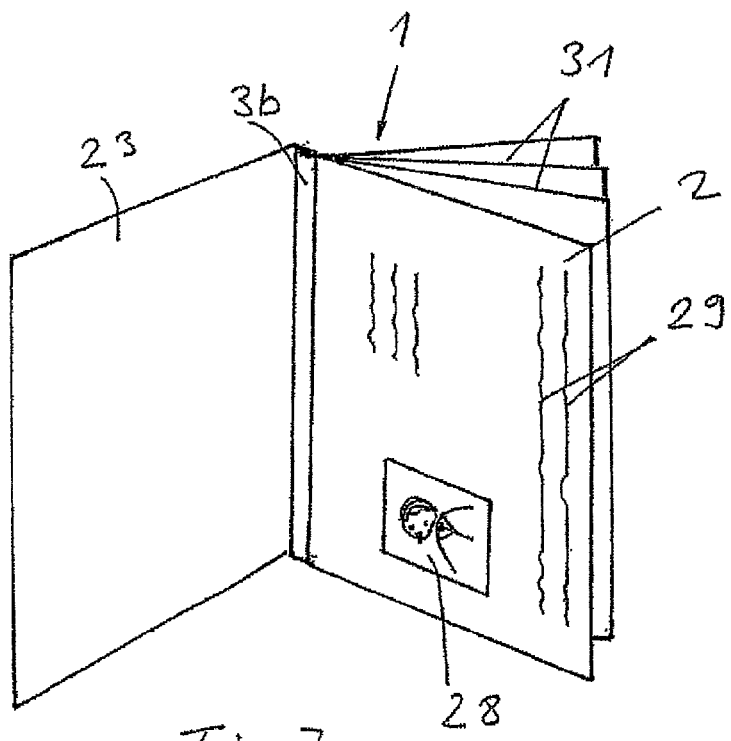
FIG. 7 shows, in schematic form, a three-dimensional view of a booklet according to the invention, this being open.
Figure 8:
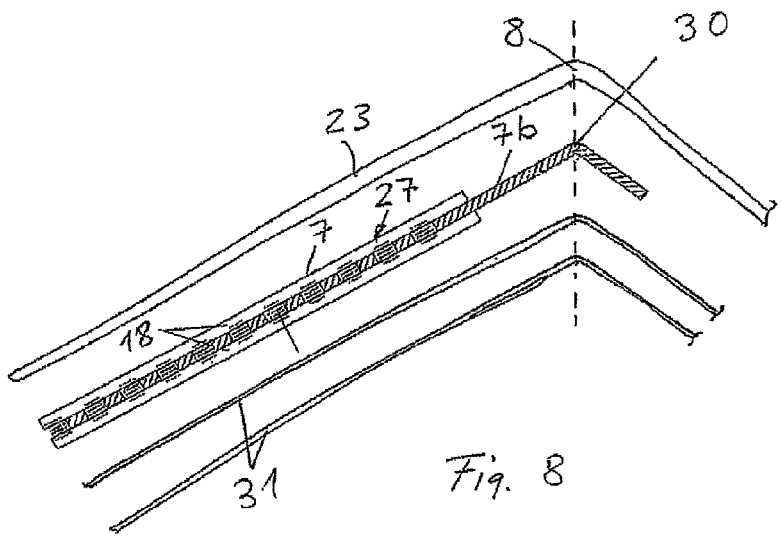
FIG. 8 shows a section through the booklet according to FIG. 7.

The booklet 1 shown in FIGS. 7 and 8 represents identity papers and, in particular, a passport and has a conventional cover 23, conventional sheets 31 bound into the cover 23 and a data page 2, which is personalized and is produced in the form of a plate from comparatively rigid plastic. The data page 2 has, for example, a portrait 28 applied in the laser process and further data 29 which are necessary for the usual personalization. For instance, these data 29 include the date of birth, the home town and a person number. The data page 2 thus identifies the authorized carrier of the booklet 1 and is secured against manipulation.

Figure 1:
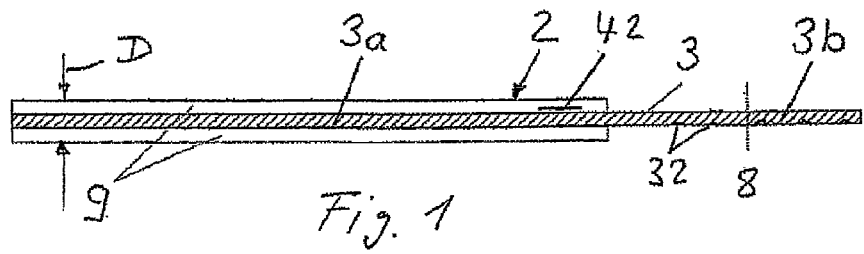
FIGS. 1-5 each show a section through a data page according to the invention.

The data page 2 shown in FIG. 1 is produced by lamination. Two data carriers 9 are produced from polycarbonate, for example, and can be provided with the aforementioned data 28 and 29. Likewise, data can be contained in a chip 42 or another suitable electronic component. The chip 42 is arranged in one of the data carriers 9, for example laminated in. Laminated in between these two data carriers 9 is a flexible layer 3, which is bound into the data page 2 by a region 3a and, for example, is produced from polyethylene terephthalate. The binding is carried out by means of a lamination process, in which the two data carriers 9 are connected to the flexible layer 3 in the region 3a. The region 3a, as can be seen, extends over the entire region of the two data carriers 9. The flexible layer 3 has a region 3b which protrudes from the two data carriers 9. This region 3b is strip-like and substantially narrower than the two data carriers 9. In this region 3b there extends a sewing point 8, at which the flexible layer 3 is sewn into the booklet 1. This sewing point 8 correspondingly forms a bending point, according to FIG. 8. A design with only one data carrier 9 is also conceivable. On the opposite side of the flexible layer 3 there can then be a layer without data. This is also true of the following designs, in which a flexible layer is arranged between two outer layers.

The flexible layer 3 is, for example, a textile, for example a woven fabric or knitted fabric or a thin flexible sheet provided with cutouts or apertures, in particular a thin flexible plastic film. The flexibility of the layer 8 is comparable with that of conventional sheets of a passport or is even higher. In the protruding region 3b, security embossments 32 or else other security features are provided, for example security imprints or pigmentations. If the flexible layer is a woven fabric, then security threads, not shown here, can be introduced into the region 3b, for example woven in loosely. The two data carriers 9 are thus firmly connected to the flexible layer 3 and cannot be separated from the matter without being noticed. The thickness D of the data page 2 preferably lies in the range of the usual standards and stipulations, in particular in accordance with ICAO, Doc. 9303.

Figure 2:
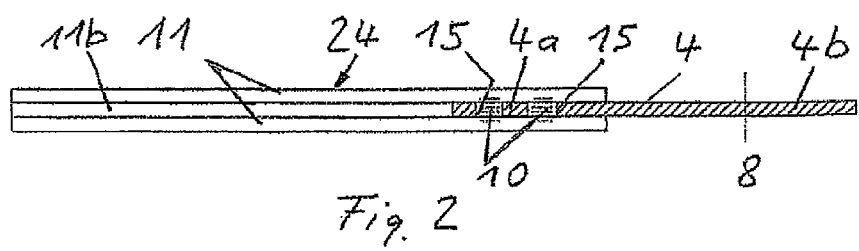

FIG. 2 shows the data page 24 according to a variant. In the latter, a flexible layer 4 is provided which is likewise a thin flexible sheet or a woven fabric, for example. The flexible layer 4 has a region 4a which is bound in between two data carriers 11 and which extends over these data carriers 11 only in some regions. In this region 4a there are provided apertures 15, in which connecting points 10 are formed. The apertures 15 can also be mesh openings of a textile. The two outer data carriers 11 are connected, for example by means of lamination, to a central layer 11b, which substantially has the same thickness as the flexible layer 4. The two outer data carriers 11 are, for example, connected substantially non-detachably to the central layer 11b and to the flexible layer 4, for example by means of welding, lamination or by means of adhesive bonding. The flexible layer 4 is therefore bound into the data page 24 substantially non-detachably. A protruding region 4b of the flexible layer 4 is used to bind or sew the data page 24 into the booklet 1 or into the passport.

Figure 3:
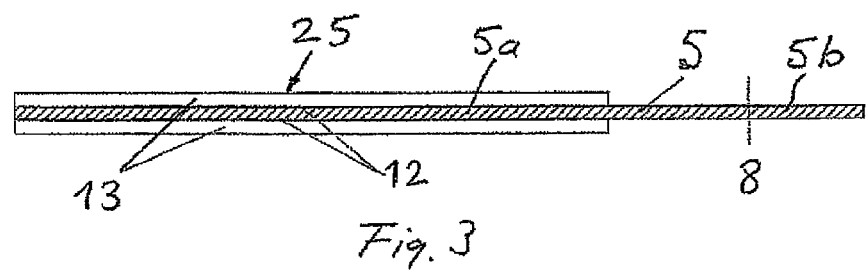

FIG. 3 shows a data page 25 which is formed in a similar way to that according to FIG. 2. A flexible layer 5 has a region 5a which, on its two surfaces, has adhesive areas 12, at which two outer data carriers 13 are connected to the flexible layer 5. Likewise, a protruding region 5b is provided here for sewing the data page 25 into the booklet 1. Here, too, the flexible layer 5 is a central layer between the two outer data carriers 13. The data carriers 13 can be multi-layer laminates.

Figure 4:
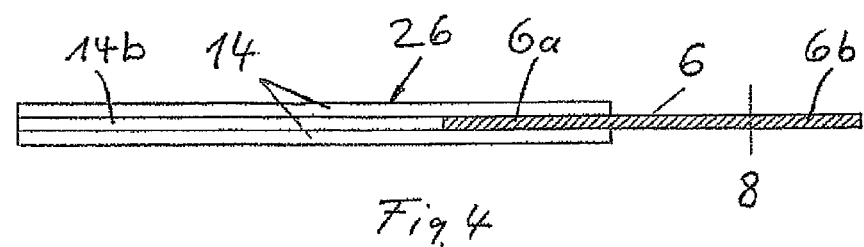

FIG. 4 shows a data page 26 which has a flexible layer 6 which is bound in between two data carriers 14. Arranged between the data carriers 14 is a central layer 14b, whose thickness corresponds to that of the flexible layer 6. The flexible layer 6 has a region 6a which is arranged between the two outer data carriers 14 and is connected to the latter. This region 6a is strip-like and extends only to some extent over the two outer data carriers 14. The central layer 14b is likewise connected to the two data carriers 14 and to the flexible layer 6. The connection can be made by lamination, welding or by adhesive bonding. As can be seen, the flexible layer 6 has no apertures. However, it can also consist of a woven fabric which has security features, for example security threads drawn in or woven in, in a protruding region 6b. The data carriers 14 and the layer 14b can have one layer or many layers.

Figure 5:
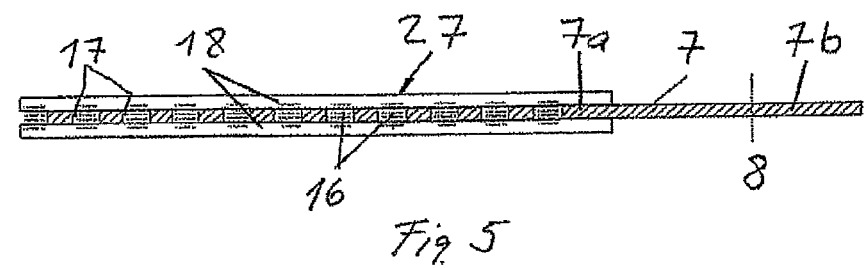
Figure 6:
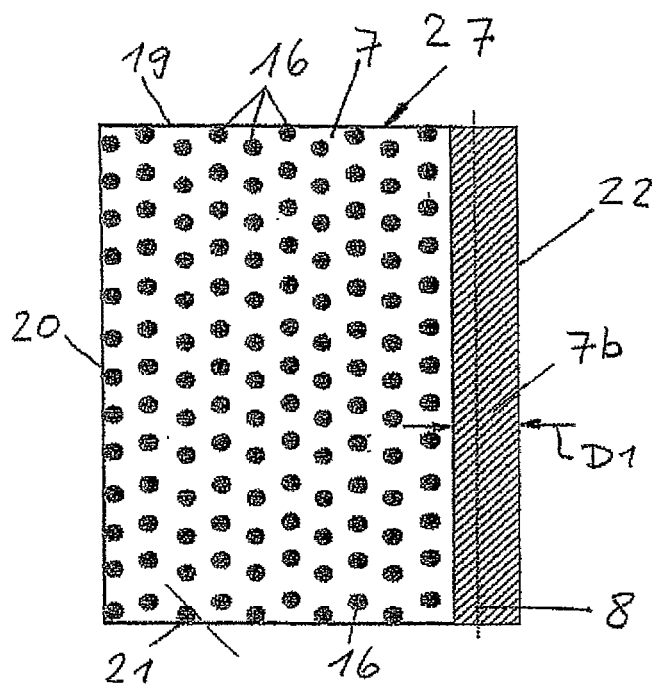
FIG. 6 shows a view of the data page according to FIG. 5.

The data page 27 shown in FIGS. 5 and 6 has a flexible layer 7 which has a plurality of apertures 17 which, according to FIG. 6, are distributed over the entire region of two thin sheets. At these apertures 17, adhesive bonding, welding or lamination connecting points 16 are formed, which connect the data carriers 18 to each other and to the flexible layer 7 in the region 7a. The apertures 17 can be distributed regularly or irregularly. The data carriers 18 can be transparent or partially transparent, so that these connecting points 16 or apertures 17, according to FIG. 6, are visible as a pattern. The apertures 17 are circular here, but non-round, for example polygonal or oval apertures, are also conceivable. In this case, too, the apertures 17 can be mesh openings of a textile.

FIG. 8 shows how the data page 27 can be bound into a booklet. In the region of a sewing-in point 8, the data page 27 is connected to the cover 23 and further sheets 31, in particular sewn in. At this point, a bend 30 is formed. Since the flexible layer 7 in the protruding region 7b is very thin and flexible, the data page 27 behaves substantially like a conventional sheet 31. It is also important that the data page 27 can be produced with a comparatively thin wall thickness D in its entire region, in particular by means of lamination.

Figure 9:
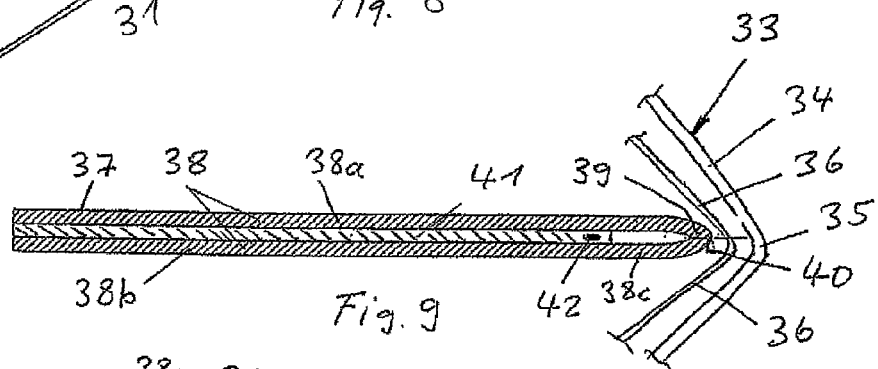
FIG. 9 shows, in schematic form, a section through a variant of a booklet according to the invention

FIG. 9 shows a booklet, in particular a passport, according to a variant. The booklet 33 has a cover 34 which is folded as usual at a spine 35 and into which a plurality of sheets 36 are bound in a known manner. The booklet 33 additionally has a data page 37 which has a flexible layer 38 having a fold 39 which runs parallel to the spine 35. Arranged between two parts 38a and 38b of the layer 38 is a data carrier 41, which can be a plastic film or else an injection-moulded part.

Figure 10:
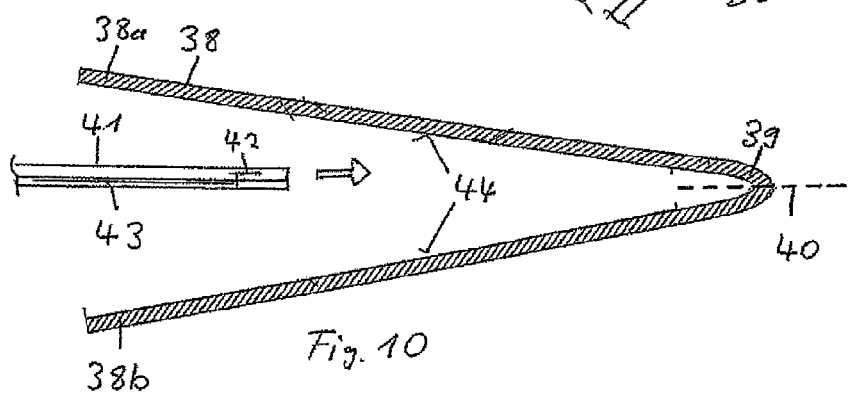
FIG. 10 shows, in schematic form, the mounting of the data carrier.

Embedded in the data carrier 41 is an electronic component and, in particular, an electronic chip 42, which is connected to the antenna 43 indicated in FIG. 10. The chip 42 contains data which can be read without contact. The chip 42 can also have a contact interface. The antenna 43 can also be located completely in the data carrier 27. Also conceivable is the integration of a dual chip module into the data carrier 27, which can be addressed by a contact area and without contact via an antenna. A chip 42 is also possible in the data carriers according to FIGS. 1-5 and 8. The layer 41 preferably also contains data that can be detected visually and which, for example, are applied in a known manner by means of a laser.

The flexible layer 38 is firmly connected to the data carrier 41 according to the invention by means of lamination. During lamination, the data carrier 41 is softened and fuses to the flexible layer 38. The flexible layer 38 is a plastic film or a textile, in particular a woven fabric. A textile or a woven fabric permits an intimate and substantially non-detachable connection between the flexible layer 38 and the data carrier 41. As can be seen in FIG. 9, a strip-like region 38c protrudes from the data carrier 41, and this region 38c is thus flexible and at least substantially more flexible than the other region of the data page 37. Provided in the fold 39 of this flexible region 38c is a sewing-in point 40, which extends along the fold 39 and at which the data page 37 is firmly committed to the sheets 36 and the cover 34.

According to FIG. 10, the flexible layer is bound in at the sewing-in point 40 before the data carrier 41 is connected to this flexible layer 38. The data carrier 41 is thus laminated to the flexible layer 38, after the flexible layer 38 has been bound into the booklet 33 and, in particular, has been sewn in. When the data carrier 41 is bound in, it is connected to the inner side 44 of the flexible layer 38, so that the data page 37 shown in FIG. 9 is produced. A design in which the chip 42 and the antenna 43 are applied directly to the flexible layer 38, for example adhesively bonded on, is conceivable. Then, the two parts 38a and 38b of the layer 38 are connected to each other, for example fused or adhesively bonded to each other. This design has the advantage that the data carrier 41 or the chip 42 and the antenna 43 can also be introduced into the booklet 33 subsequently. It is thus possible for a booklet 33 to be produced which has the flexible layer 38 but still no data carrier 41. The flexible layer 38 is then sewn into the booklet 33, as shown in FIG. 10. The two parts 38a and 38b are thus not yet connected to each other but firmly bound in or sewn in. This permits simple and economical and intrinsically conventional production of the booklet 33. If a data carrier 41 is needed, then the layer 31 can be incorporated in the flexible sheet 38 by means of lamination.

What is claimed is:

1. A method of producing a booklet having a plurality of sheets between a cover and each sheet having a front side and a reverse side, comprising the steps of:
providing a data carrier having at least a first outermost layer and a second outermost layer;
connecting the data carrier to the cover and the plurality sheets, via a first region of at least one flexible layer, wherein the first region of the flexible layer protrudes from the data carrier,
wherein in a second region of the flexible layer, the flexible layer includes means for substantially non-detachably connecting the data carrier to the flexible layer,
wherein the flexible layer is a textile, a woven fabric, or a knitted fabric,
wherein the flexible layer forms two outer layers or one inner layer; and
binding the flexible layer into the data carrier via lamination, wherein the flexible layer has apertures where welding points are formed that substantially non-detachably connect the flexible layer to at least one of the first outermost layer and the second outermost layer of the data carrier, wherein the flexible layer is directly adjacent the first outermost layer and the second outermost layer, wherein the apertures are formed and provided by mesh openings of the textile, the woven fabric, or the knitted fabric,
wherein said mesh openings are present and distributed over said first region and said second region.

2. The method of claim 1, wherein the data carrier has two outer layers, and wherein each outer layer on the inside thereof includes an adhesive area which connects the two layers to the flexible layer.

3. The method of claim 1, wherein the flexible layer extends over the entire data carrier.

4. The method of claim 1, wherein the flexible layer extends over a part of the data carrier.

5. The method of claim 1, wherein embossments alone or embossment and security threads, security prints, or pigmentations are arranged in the first region.

6. A data page for use with a booklet having a cover and a plurality of sheets situated between a cover, wherein each sheet includes a front side and a reverse side, wherein the data page includes at least one flexible layer, wherein a first region of the flexible layer is adapted to protrude from a data carrier of the data page, the data carrier having at least a first outermost layer and a second outermost layer, wherein the first region is adapted to be connected to the cover and the plurality of sheets, wherein in a second region of the flexible layer, the flexible layer includes apertures for connecting the flexible layer to at least one of the first outermost layer and the second outermost layer of the data carrier, wherein the flexible layer is directly adjacent the first outermost layer and the second outermost layer, wherein the flexible layer is a textile, a woven fabric, or a knitted fabric, and wherein the flexible layer forms two outer layers or one inner layer, wherein the apertures are provided and formed by mesh openings of the textile, the woven fabric, or the knitted fabric, and wherein said mesh openings are present and distributed over said first region and said second region.

7. The data page of claim 6, wherein the textile has apertures for forming connecting points to connect the data carrier with the flexible layer.

8. The data page of claim 6, wherein the flexible layer has a protruding free region adapted to be bound into the booklet by sewing.

9. The data page of claim 6, wherein the protruding free region includes security features.

10. The data page of claim 9, wherein the security features are one of embossments, security prints, pigmentations or security threads woven into the protruding free region.

11. The data page of claim 6, wherein the flexible layer extends over the entire data carrier.

12. The data page of claim 6, wherein the flexible layer extends over a part of the data carrier.

13. The data page of claim 6, wherein the data carrier has two outer layers, and wherein each outer layer on the inside thereof includes an adhesive area which connects the two layers to the flexible layer.

14. A booklet comprising:
a cover;
a plurality of sheets situated between a cover, wherein each sheet includes a front side and a reverse side;
at least one data page connected to the cover, wherein the data page includes at least one flexible layer, wherein a first region of the flexible layer protrudes from a data carrier of the data page, wherein the data carrier has at least a first outermost layer and a second outermost layer, wherein the first region is connected to the cover and the plurality of sheets, wherein in a second region of the flexible layer, the flexible layer includes means for substantially non-detachably connecting at least one of the first outermost layer and the second outermost layer of the data carrier to the flexible layer, wherein the flexible layer is directly adjacent the first outermost layer and the second outermost layer, wherein the flexible layer is a textile, a woven fabric, or a knitted fabric, wherein the flexible layer forms two outer layers or one inner layer; and
means for binding the flexible layer into the data carrier, wherein said mesh openings are provided by the structure of said textile, woven fabric or kilted fabric and wherein said mesh openings are present and distributed over said first region and said second region.

15. The booklet of claim 14, wherein the data page is bound into the booklet, wherein the data page sewn in by the flexible layer laminated directly to the data carrier.

16. The booklet of claim 14, wherein the data carrier is produced from plastic, is provided with data for personalization of the booklet, and is flatly connected to the flexible layer.

17. The booklet of claim 14, wherein the flexible layer is connected to the data carrier on two outer sides thereof.

18. The booklet of claim 14, wherein the flexible layer is folded and has a fold including a sewing-in point formed therein.

19. The booklet of claim 14, wherein the data carrier has an addressable electronic component, and wherein the addressable electronic component is a chip.

20. The booklet of claim 14, wherein the addressable electronic component is integrated into the data carrier and is laminated therein.

* * * * *